UNITED STATES PATENT OFFICE.

JOHN W. WILLIAMS, OF FRESNO, CALIFORNIA.

EGG-PRESERVING COMPOSITION.

1,245,294. Specification of Letters Patent. Patented Nov. 6, 1917.

No Drawing. Application filed April 6, 1917. Serial No. 160,315.

*To all whom it may concern:*

Be it known that I, JOHN W. WILLIAMS, a citizen of the United States, residing at Fresno, in the county of Fresno, State of California, have invented certain new and useful Improvements in Egg-Preserving Compositions; and I do hereby declare the following to be a full, clear, and exact description of the invention, such as will enable others skilled in the art to which it appertains to make and use the same.

This invention relates to preserving compositions, and has particular reference for compositions for preserving eggs.

The object of the invention is to provide a coating composition in which fresh eggs may be immersed to fill the pores in the shells so as to prevent the evaporation of the contents of the shell and also to prevent the absorption of moisture and other contaminating influences.

Furthermore, it is an object of the invention to provide a coating composition of this character which will permit the ready immersion of the eggs. To this end, I form a composition of petrolatum and cotton seed oil together with the juice of milk weed and gutta percha. The cotton seed oil provides a base which will flow readily and receive the eggs for immersion, while the petrolatum, milk weed and gutta percha provide the ingredients whose combination imparts that degree of viscosity to the composition which will cause the eggs to be covered with a tough impervious coating which will not lie upon the egg in a thick coating but rather in a thin film. In carrying out my invention I mix fourteen parts of cotton seed oil with one part of petrolatum, and add thereto one-twentieth to one-tenth of one per cent. of gutta percha and from one-half of one per cent. of milk weed juice, the mixture of the above ingredients being carried out under such circumstances as will provide a thorough intermingling of all the parts.

In using the composition it is heated to a temperature approximating a hundred and forty-five degrees F. and after the eggs have first been dipped in boiling water for a period of probably five seconds, they are then submerged in the composition and are allowed to remain for from fifteen to twenty seconds. They are then taken out and are immediately stored in a case in a cool place. The immersing of the eggs in the boiling water sterilizes the shells and also warms them in preparation for the bath in the composition, so that the compound takes immediate effect upon the surfaces of the shells.

The preservative qualities of the composition are found principally in the petrolatum, gutta percha and milk weed, in that they provide a gummy adhesive surface which forms a coating over the pores of the eggs and thoroughly seals the pores so that they exclude air and prevent the evaporation of the contents of the eggs, and also prevents the absorption of moisture and other contaminating external influences. The cotton seed oil renders the viscous substance of the proper density to permit the ready immersion of the eggs therein and also to permit the eggs to take up a coating of the material. Likewise as the eggs are removed the density is such that all but a thin film of the composition runs off of the eggs, and when the eggs and composition cools off, an impervious coating of extreme thinness is left.

The addition of the gutta-percha and milk-weed to the mixture adds to the viscosity of the petrolatum and cotton seed oil, in that they add rubber and gum which toughens the filmy coating found on the eggshell, comparative tests to determine the quantities and benefits of the two gummy materials having been carefully carried out.

What I claim as my invention is:—

1. A preserving composition for eggs consisting of a cotton seed oil base, petrolatum, milk weed and gutta percha.

2. A preserving composition for eggs comprising a cotton seed oil base, petrolatum and milk weed.

3. A preserving composition for eggs consisting of fourteen parts cotton seed oil, one part petrolatum, one-twentieth of one per cent. of gutta percha and one half of one per cent. of milk weed.

In testimony whereof, I affix my signature in the presence of two witnesses.

JOHN W. WILLIAMS.

Witnesses:
J. P. MARRIOTT,
J. A. JOHNSON.